(No Model.) 3 Sheets—Sheet 1.
W. BIDDLE.
ELECTRIC CAR LIGHTING APPARATUS.
No. 547,536. Patented Oct. 8, 1895.
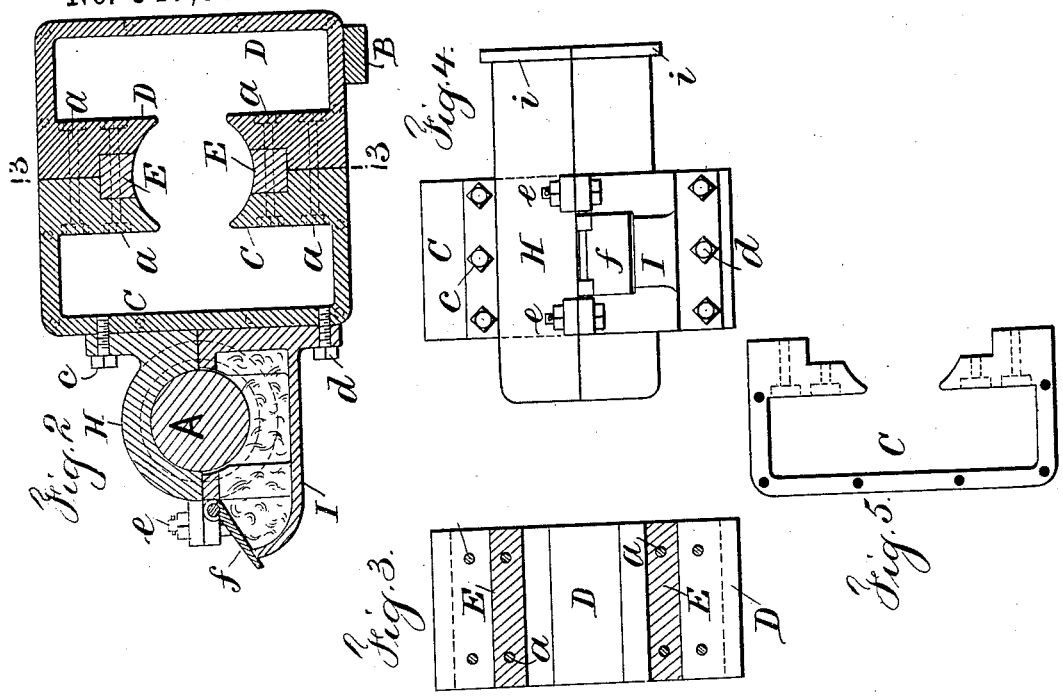
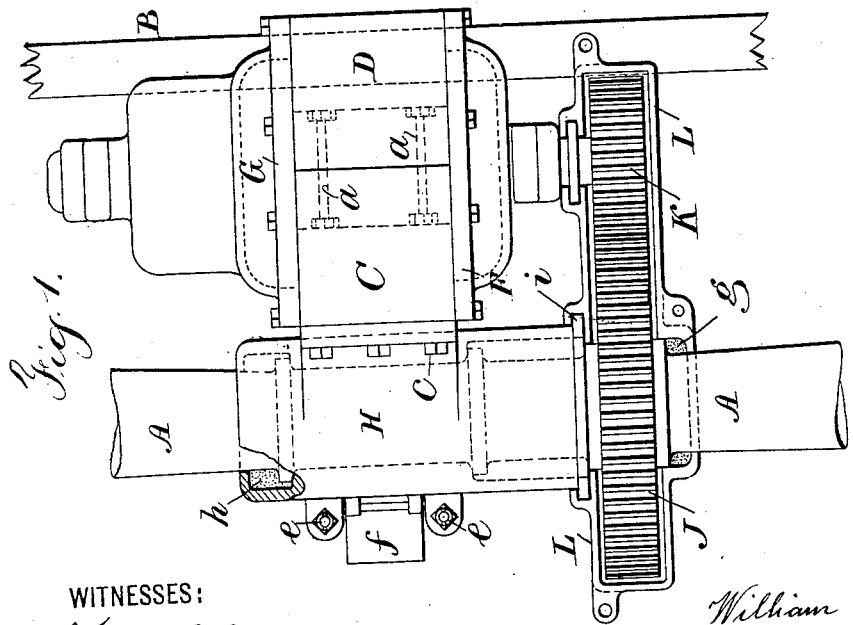
WITNESSES:
Frank S. Obey
Chas. H. Smith
INVENTOR
William Biddle
BY
Lemuel W. Serrell
ATTORNEY

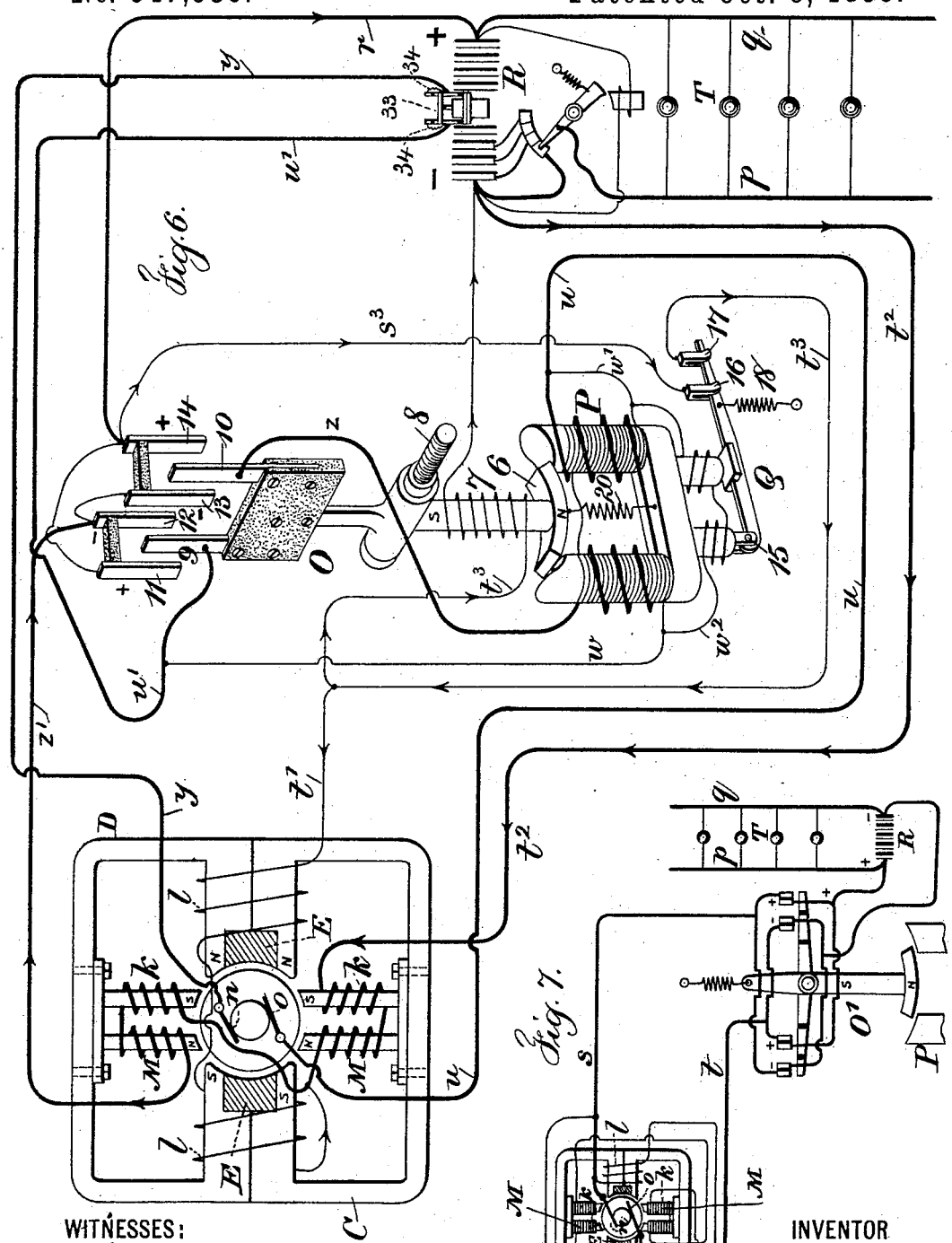

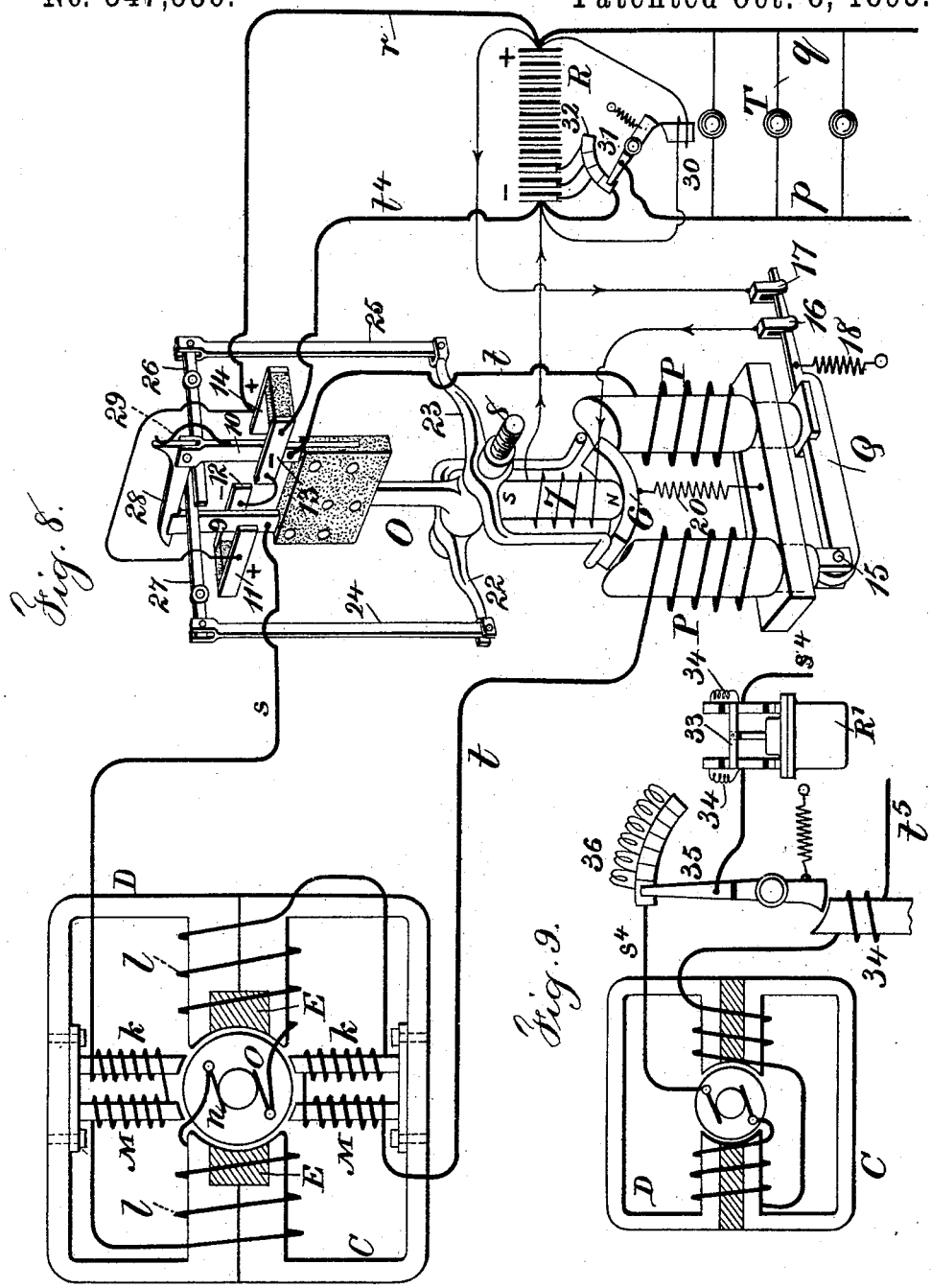

UNITED STATES PATENT OFFICE.

WILLIAM BIDDLE, OF BROOKLYN, NEW YORK.

ELECTRIC CAR-LIGHTING APPARATUS.

SPECIFICATION forming part of Letters Patent No. 547,536, dated October 8, 1895.

Application filed December 24, 1894. Serial No. 532,765. (No model.)

*To all whom it may concern:*

Be it known that I, WILLIAM BIDDLE, a citizen of the United States, residing at Brooklyn, in the county of Kings and State of New York, have invented an Improvement in Electric Car-Lighting Apparatus, of which the following is a specification.

In this improvement I make use of a peculiarly-constructed dynamo, in which the bar or connection between the poles of the field-magnets forms part of the inclosing case, so that such field-magnets can be forged out of soft iron with great facility, the expense of construction lessened, and the efficiency of the dynamo increased in consequence of being light and strong and easily inclosed from dust, and in order to regulate the current developed by the rotation of the armature in proportion to the speed of the car and of the armature driven thereby, I make use of neutralizing field-magnets at the sides of the armature and in the space between one field-magnet and the other, and I provide a compound switch actuated automatically and in accordance with the direction of the current generated by the armature to properly direct the current to the secondary battery.

In the drawings, Figure 1 is a plan view of the dynamo and its connection with the car-axle. Fig. 2 is a vertical section through the axle and through the field-magnet poles and their frame. Fig. 3 is a section at the line 3 of Fig. 2. Fig. 4 is an elevation of the sleeve upon the axle and the oil-box. Fig. 5 shows one part of the field-magnet poles detached. Fig. 6 is a diagram of the circuit connections with the neutralizing-magnets in series. Fig. 7 is a diagram with such neutralizing-magnets in a shunt. Fig. 8 is a diagram similar to Fig. 6, except that the field helices and the helices of the neutralizing-magnets are in series; and Fig. 9 represents a rheostat in the main circuit actuated by a magnet the helix of which is also in the main circuit, and also a rheostat or resistance brought into the main-line circuit by pressure developed in the cell of the secondary battery.

At A, I have represented a portion of the car-axle, and at B a bar, which may extend across from one side to the other of the car-truck and support the dynamo and allow the same to accommodate itself to any movement of the axle, and upon this axle are collars, between two of which the gear J is bolted to drive the pinion K upon the armature-shaft, and there is a bearing H that rests upon the axle between two collars thereof, and which bearing is bolted to the oil-box I by the bolts $e$, and such oil-box has a cover $f$ for the introduction of oil, and the bearing H is extended and formed with a flange $i$ passing into a recess in the case L, that incloses the gear J K, and this case is made in two parts divided horizontally and bolted together, and there is a recess containing a packing $g$, that excludes dust from the case at this end of the connection with the axle, and the bearing H is extended in the other direction and provided with an inwardly-turned flange for receiving and retaining the packing $h$ around the axle A to exclude dust at this end of the connection with the axle; and it is to be understood that the packing $g$ and $h$ is to be of fibrous material that can easily be introduced and will yield as the parts revolve, and also will become saturated with lubricating material passing from the oil-box I, or otherwise supplied, and hence the packing will effectually exclude dust from the working parts of the mechanism at the openings within which the axle revolves, the other parts of the inclosing-case being bolted tightly together.

In the construction of the dynamo I employ two pole-frames C and D, each of which is formed of the general shape represented in Fig. 5, and the end faces of these frames are in line with each other, so that the plate F can be bolted to one end of the pole-frame and extend to and connect with the case L, and the plate G can be bolted to the other end of the pole-frame, and it is provided with a recess adapted to receive the commutator, and such end plates F and G are provided with bearings for sustaining the armature-shaft that is rotated by the pinion K.

Each pole-frame C or D can be easily forged up to shape, the same being made of wrought-iron, and it is advisable to introduce steel pole-pieces E in the recesses provided for them and to bolt the parts of the poles together by the bolts $a$, the surfaces of the respective parts of the metal being fitted true, so as to be in intimate contact when bolted together, and the helices of the field-magnets are to surround the poles to magnetize the same, as usual, and the oil-box I and the bearing H are bolted to one side of the pole-frame C by the bolts $c$ and $d$.

The commutators and brushes are to be of any desired character, and one of the features of the present invention relates to the neutralizing-magnets M, which are applied upon the pole-frames C and D, with their poles adjacent to the sides of the armature and between the poles of the field-magnets, and the helices $k$ of these neutralizing-magnets M are either in the main circuit in series with the helices $l$ of the field-magnets, as seen in Fig. 8, or the helices $l$ of the field-magnets may be in a shunt-circuit, as seen in Fig. 6, and hereinafter more fully described, or the helices $l$ of the field-magnets and the helices $k$ may be in shunt-circuits between the main-circuit wires from the brushes $n$ $o$, as seen in the diagram Fig. 7. In either instance the operations performed are substantially the same—that is to say, the steel pole-pieces E retain sufficient magnetism to start the dynamo after the car may have been standing still and in proportion to the speed of the car, so the armature of the dynamo will be driven at greater or less speed, and the current developed by the wires of the armature cutting the lines of magnetism of the field-magnets would under ordinary circumstances vary in proportion to the speed; but the helices of the neutralizing-magnets M are to be so wound and so proportioned that as the speed of rotation increases the energy of these neutralizing-magnets M will also increase, and the reverse as the speed lessens; and upon reference to Figs. 6 and 8 the polarity of the respective magnets will be apparent, and the action of the neutralizing-magnets will also be apparent—that is to say, the neutralizing-magnets are so arranged that their poles alternate in polarity with those of the field-magnets, with a pole S of the neutralizing-magnet adjacent to a pole N of the field-magnet, and a pole N of the neutralizing-magnet adjacent to a pole S of the field-magnet. The consequence of this arrangement is that the lines of magnetism are diverted from the armature in proportion to the energy of the neutralizing-magnets, and these neutralizing-magnets each having two poles and alternating, as aforesaid, and being energized in proportion to the speed of rotation when the dynamo is started, the lines of magetism between the pole-pieces of the field-magnets will be cut by the wires of the armature and currents set up in such armature, and the neutralizing-magnets will have but little effect until the current set up by the armature increases in consequence of the increase of speed of the armature, and the magnetism of the neutralizing-magnets being augmented in proportion to the speed will set up reverse lines of magnetism to be cut by the armature-wires, and to this extent the efficiency of the poles of the field-magnet in developing current in the armature will be lessened, and by properly proportioning the winding of the field-helices and the helices of the neutralizing-magnets so the current developed in the armature can be maintained with approximate uniformity.

I apply in the circuits between the secondary battery R and the brushes $n$ $o$ a compound switch O, having an armature 6 and pivoted at 8, and at one side of this compound switch there are insulated contacts 9 and 10 between the stationary insulated contacts 11 and 12 and 13 and 14, and at the other end of this compound switch there is an armature 6, that is polarized by the helix 7, and the electro-magnet P is adjacent to the armature 6, and there is a circuit-breaker Q pivoted at 15 and adapted to close the circuit between the contacts 16 and 17 or to break the same when the lever Q is drawn back by the spring 18.

The lamps T are in multiple arc between the circuit-wires $p$ and $q$ from the secondary battery R, and referring now to Fig. 8 it will be observed that the circuits from the brushes $n$ $o$ include the helices $k$ $l$ in series, and the wires $s$ and $t$ pass to the switch O, the wire $s$ being connected with the contact 9, and the wire $t$, passing through the helices of the magnet P and being connected to the contact 10 and the helix 7, by which the armature 6 is polarized, is in a circuit between the $+$ and $-$ ends of the secondary battery R, and the contacts 16 and 17 are in that circuit.

If, now, the current from the secondary battery R is as great as the current set up by the armature of the dynamo, the one will neutralize the other, and the spring 18 will draw away the circuit-breaker Q, and the circuit between the poles of the secondary battery will be broken between 16 and 17, and at the same time the spring 20 will bring the compound switch O to a central position, such as shown in Figs. 6 and 8, and the contacts of the main circuit will be broken. The same effect is produced in the circuits represented in Fig. 6; but it will be observed that the $+$ side of the secondary battery R is connected by the wire $r$ to the contact 14, and there is a wire $s^3$ leading to the contact 16, and the wire $t^3$ from the contact 17 passes to the helix 7 and to the $-$ pole of the secondary battery. Hence this circuit is broken between 16 and 17, as aforesaid; but there is a branch wire $t'$ leading to the helices $l$ of the field-magnets and to one of the wires of the main circuit passing through the helices $k$ of the neutralizing-magnets.

Upon the compound switch O, Fig. 8, there are arms 22 23 and connecting-rods 24 25 to the levers 26 27, and there is a circuit-closer 28 between the contacts 9 and 10, that is closed by a spring 29 when the compound switch O is in a neutral central position, as shown in Fig. 8; but when the said switch is swung in either direction upon its pivot 8 the circuit-closer 28 is lifted to break the circuit between 9 and 10 by the arms 22 or 23 acting through the connecting-rod 24 or 25 and the lever 26 or 27 to raise such circuit-closer 28; but in the position represented it is to be presumed that the car is standing still and the armature of the dynamo is at rest. If now the car is started and the armature commences to revolve, there is a current set up thereby in consequence of the residual magnetism in the steel pole-pieces E, and such current circulates from $n$ through $l\ k$ and by the wire $s$ to 9 and by 28 and 10 to $t$ and through the helices of the magnet P and back to the helices $k$ and $l$ to the brush $o$, and by this current the magnet P is energized and the armature 6 swung in either one direction or the other according to the direction of rotation of the armature and the current set up, and as the armature 6 is swung either lever 26 or 27 lifts the contact 28 and breaks the circuit between 9 and 10 simultaneously with the contacts 9 and 10, closing circuit with 11 and 13 or with 12 and 14. If the circuit is closed to 12 and 14, the current passes from 9 by 12 and across to 13 and by the wire $t^4$ to the secondary battery R, and the current passes from 10 to 14 and by the wire $r$ to the secondary battery R, so that the secondary battery is energized by such current, and simultaneously with the magnetization of the magnet P its lower portions attract the lever Q and close the circuit between 16 and 17, so that the secondary battery maintains a uniform polarity through the helix 7, so that the compound switch O is held firmly in the position to which it may have moved until the electromotive force of the dynamo sinks below that of the secondary battery, under which circumstances the magnetism in the circuit $r\ s\ t\ t^4$ is neutralized, the magnetism in P becomes $nil$, and the spring 20 brings the compound switch into the position shown in Fig. 8, and the spring 18 draws away the lever Q, breaking the circuit between 16 and 17, so that there is no circuit from the secondary battery except that containing the incandescent lamps T. If the direction of the rotation is the reverse, so that the polarity set up in the magnet P causes the armature 6 to swing so as to close circuit between 9 and 11 and 10 and 13, the current passes from $o$ through $l\ k\ t$, through the helices of P to 10, and from 13 to the secondary battery R, and by $r$ 14 and the wire to 11, and by 9 and the wire $s$ to the helices $k\ l$ and to the brush $n$.

I have shown in Fig. 8 an electromagnet 30 in multiple arc between the circuit-wires $p\ q$ and a lever 31 acted upon by such magnet 30, the circuit-wire $p$ being connected to such lever 31, and there are contacts 32 with branch connections to cells of the secondary battery R. Hence if the electromotive force of the secondary battery is too great it will act upon the magnet 30 and move the lever 31, so as to throw out of circuit one or more cells of the secondary battery and thereby lessen the current in the lamp-circuit; but at the same time the resistance of the secondary battery remains the same to the current passing from the dynamo.

In Fig. 9 is represented a cell R' of the secondary battery with a tightly-closed cover and a flexible diaphragm by which the bar 33 can be moved when the pressure of gas in the cell may be abnormally great, and in so doing the resistances 34 will be included in the circuit $s^4\ t^5$ leading to helices of the field-magnets and to the brushes, and I have also shown an electromagnet 34, the helix of which is in the main circuit $t^5$ and acts upon a lever 35 to include in the circuit $s^4$ more or less resistance in the rheostat 36, so that such resistance 36 will lessen the output of the current in the main line when the magnet 34 is abnormally energized, thus tending to regulate the output of the current and lessen the variations in the same due to differences in the speed of rotation of the armature.

In Fig. 7 I have represented the helices $k$ of the neutralizing-magnets M in one shunt-circuit between the main-circuit wires $s$ and $t$ and the helices $l$ of the field-magnets in another shunt-circuit between such main-circuit wires $s$ and $t$, and I have illustrated a compound switch O' with two arms, with insulated plates to close the circuit in either one direction or the other direction, according to the polarity of the magnet P, that is due to the direction of current passing from the brushes of the commutator, and in this figure the insulated contacts act in substantially the same manner as heretofore described with reference to Fig. 8 in bringing the current in the proper direction to the secondary battery R.

The circuits represented in Fig. 6 correspond generally to those shown in Fig. 8; but in place of using the circuit-closer 28 between the contacts 9 and 10 I obtain a closed circuit in the starting of the dynamo through the bar 33 of one of the cells of the secondary battery R, the parts being similarly arranged to that shown in larger size in Fig. 9.

When the parts are at rest and the compound switch O stands in the position indicated in Fig. 6, the circuit from the secondary battery through 7, $t^3$, and $s^3$ and $r$ to the secondary battery R is broken at 16 and 17 by the spring 18 drawing back the lever Q.

When the armature of the dynamo is rotated, a current will be set up from $n$, through $y$ 33 $u'\ w$, through the fine wire of the magnet-helix P, and by the wire $w'$ and $u$ back to the brush $o$, and there will be also a current passing as a branch or shunt through the wire $w^2$ and energizing the cores that act upon the lever Q, and the circuit will be instantly closed between 16 and 17, and the magnet P will be simultaneously energized and act upon the armature 6 to move the same either in one direction or the other. If the movement brings the plates 10 and 14 together and also 9 and 12, the current passes from $n$ by $y$ 33 $u'$ 9 12 $z'\ k\ k$, and by $t^2$ to the negative of the secondary battery R, and by $r$ 14 10 $z$ through the helix of the magnet p, and by u to the brush o, and the battery-current is maintained through 7 $t^3$ $t'$ $l$ $l$ and back through the helix k to the secondary battery, and also by the wire $t^3$, contacts 16 and 17, and wires $s^3$ and r. If the polarity is such that the plates 10 and 13 and 9 and 11 are brought together, the current passes from o by u through the helix of the magnet P to the plate 10, thence by 13 12 and wire $z'$ to k k, and by the wire $t^2$ to the secondary battery R, and from such battery R by the wire r to 14 11 9 $u'$ 33 y to the brush n.

The resistances of the respective helices are to be such that the lever Q will be acted upon slightly in advance of the polarization of the magnet P, so as to close the circuit to the secondary battery between the contacts 16 and 17, so that the circuit will be completed through the helix 7 to insure the polarizing of the armature 6, in order that the same may swing in the proper direction according to the polarity of the magnet P.

It will be observed that in Fig. 6 the helices k of the neutralizing-magnets are in series in the main-line circuit, and the helices l of the field-magnets are in a branch from the same passing to the secondary battery, and the connections represented in Fig. 6 are shown with special reference to this arrangement of helices and their connections in the dynamo; but when the helices of the dynamo are in series, as shown in Fig. 8, the circuit connections to the parts of the compound switch O can be made more simple, as illustrated in said Fig. 8.

It is sometimes important to lessen the amount of iron in the field-magnet cores in cases where the armature is liable to varying speeds. To allow for so doing I sometimes make the pole-pieces and the frames of nearly uniform thickness, as seen in Fig. 9, and introduce a filling-piece of non-magnetic material between the half-poles to maintain the required sizes for the helices and for the armature.

It will be apparent that when the pressure of gas in one of the cells of the secondary battery R, Fig. 6, causes the bar 33 to move and throw in the resistances 34, the electromotive force of the dynamo is lessened by the said resistances 34 being included in the circuit of the field-helices.

I claim as my invention—

1. The combination in an apparatus for electric car lighting, of an armature and connections for revolving such armature from the car axle, field helices and their poles adjacent to the armature and at opposite sides thereof, electro-magnets having each a north and south pole adjacent to the armature and between the poles of the field magnets, and electric circuit connections for energizing the said magnets in proportion to the speed of rotation of the armature, for setting up reverse lines of magnetism to be cut by the armature wires for equalizing or nearly so the current developed in the revolving armature, substantially as set forth.

2. In a dynamo for electric car lighting, the field magnets having divided poles and integral plates connecting the half poles together in pairs and means for securing the half poles together, and covers bolted to the plates and forming with them an inclosure for commutators and armature, substantially as specified.

3. The combination with the poles and pole frames and bolts for connecting them together, of end plates bolted on to the pole frames, a bearing for resting upon the axle and bolted to one of the pole frames, an oil-box beneath the bearing, and a gear for connecting the axle and the shaft of the armature, and a case for inclosing such gearing and excluding the dust, substantially as set forth.

4. The combination in a dynamo for electric car lighting, of two frames each of which is provided with a half pole piece, bolts for securing the half pole pieces together, and steel poles introduced in recesses in the pole pieces and held in position by the bolts, substantially as set forth.

5. The combination in an apparatus for electrically lighting railway cars, of a dynamo, a storage battery, a compound switch having a polarized armature, and circuit closing contacts, and an electro-magnet the helix of which is in the main line circuit for moving the compound switch in one direction or the other according to the direction of current set up in the armature of the dynamo to cause the current to flow in the proper direction to the secondary battery, a circuit closing lever and contacts, and a helix in a circuit from the secondary battery for polarizing the armature of the compound switch, such circuit being broken by the lever when the current set up by the dynamo is the same or nearly the same as that of the secondary battery, substantially as set forth.

6. The combination with the dynamo, secondary battery and circuits between the same, of a lamp circuit containing incandescent lamps in multiple arc, a magnet the helix of which is also in multiple arc in the lamp circuit, a lever acted upon by the said magnet, and contacts and connections from the same to cells of the secondary battery for throwing out of the lamp circuit more or less of the cells of the secondary battery according to the strength of the current therefrom, substantially as set forth.

Signed by me this 21st day of December, 1894.

WILLIAM BIDDLE.

Witnesses:
 GEO. T. PINCKNEY,
 S. T. HAVILAND.